(12) United States Patent
Kim et al.

(10) Patent No.: US 10,536,188 B2
(45) Date of Patent: Jan. 14, 2020

(54) SIGNAL PROCESSING METHOD AND TRANSMITTER AND RECEIVER

(71) Applicant: Electronics and Telecommunications Research Institute, Daejeon (KR)

(72) Inventors: Pansoo Kim, Daejeon (KR); Deock Gil Oh, Daejeon (KR); Xavier Giraud, Versailles (FR)

(73) Assignee: Electronics and Telecommunications Research Institute, Daejeon (KR)

(*) Notice: Subject to any disclaimer, the term of this patent is extended or adjusted under 35 U.S.C. 154(b) by 248 days.

(21) Appl. No.: 15/453,666

(22) Filed: Mar. 8, 2017

(65) Prior Publication Data

US 2017/0279485 A1  Sep. 28, 2017

(30) Foreign Application Priority Data

Mar. 25, 2016 (KR) .................. 10-2016-0036070

(51) Int. Cl.
*H04B 1/00* (2006.01)
*H04B 1/707* (2011.01)

(52) U.S. Cl.
CPC ... *H04B 1/707* (2013.01); *H04B 2001/70724* (2013.01)

(58) Field of Classification Search
CPC .................. H04L 17/707; H04B 2001/70724
USPC ....................................................... 375/142
See application file for complete search history.

(56) References Cited

U.S. PATENT DOCUMENTS

| | | | | |
|---|---|---|---|---|
| 4,606,042 A | * | 8/1986 | Kahn | H04J 3/125 380/261 |
| 5,016,206 A | * | 5/1991 | Shinonaga | H04B 7/212 375/366 |
| 6,363,104 B1 | * | 3/2002 | Bottomley | H04B 1/7095 375/148 |
| 7,990,874 B2 | | 8/2011 | del Rio Herrero et al. | |
| 2004/0128533 A1 | | 7/2004 | Choi et al. | |
| 2007/0201568 A1 | | 8/2007 | Bae et al. | |
| 2009/0219882 A1 | | 9/2009 | Kim et al. | |
| 2010/0138722 A1 | * | 6/2010 | Harley | H03M 13/333 714/762 |
| 2011/0292972 A1 | * | 12/2011 | Budianu | H04B 1/7174 375/138 |
| 2012/0082185 A1 | * | 4/2012 | Beeler | H04L 27/0006 375/130 |

(Continued)

OTHER PUBLICATIONS

Oscar del Rio Herrero, et al., "Spread-Spectrum Techniques for the Provision of Packet Access on the Reverse Link of Next-Generation of Broadband Multimedia Satellite Systems," *IEEE Journal on Selected Areas in Communications*, vol. 22, No. 3, Apr. 2004, pp. 574-583.

(Continued)

*Primary Examiner* — Helene E Tayong
(74) *Attorney, Agent, or Firm* — NSIP Law

(57) ABSTRACT

A signal processing method, and a transmitter and a receiver are disclosed. The signal processing method may include converting a transmission signal to a non-periodic sequence type transmission signal using periodic sequences and transmitting the non-periodic sequence type transmission signal to the receiver, in which the receiver may detect a burst from the received non-periodic sequence type transmission signal.

14 Claims, 13 Drawing Sheets

(56) References Cited

U.S. PATENT DOCUMENTS

| | | | |
|---|---|---|---|
| 2013/0223544 A1* | 8/2013 | Becker | H04L 27/0014 |
| | | | 375/259 |
| 2014/0229997 A1 | 8/2014 | Kim et al. | |
| 2015/0230219 A1 | 8/2015 | Chang et al. | |

OTHER PUBLICATIONS

European Standard (Telecommunications Series), "Digital Video Broadcasting (DVB); Second generation framing structure, channel coding and modulation systems for Broadcasting, Interactive Services, News Gathering and other broadband satellite applications," *Draft ETSI EN 302 307*, V1.1.1, Jun. 2004, pp. 1-74.

European Standard, Digital Video Broadcasting (DVN); Second Generation DVB Interactive Satellite System (DVB-RCS2); Part 2: Lower Laters for Satellite standard, *ETSI EN 301 545-2*, V1.2.1, Apr. 2014, pp. 1-239.

\* cited by examiner

ND RECEIVER

SIGNAL PROCESSING METHOD AND TRANSMITTER AND RECEIVER

CROSS-REFERENCE TO RELATED APPLICATION(S)

This application claims the benefit under 35 USC § 119(a) of Korean Patent Application No. 10-2016-0036070 filed on Mar. 25, 2016, in the Korean Intellectual Property Office, the entire disclosure of which is incorporated herein by reference for all purposes.

BACKGROUND

1. Field

The following description relates to a signal processing method, and a transmitter and a receiver.

2. Description of Related Art

A transmitting and receiving device that is used to configure a communication link under an extremely low signal-to-noise ratio (SNR) environment, such as a satellite link, may be applied to a case in which an extremely low SNR condition occurs in a K-under (Ku)/K-above (Ka) band. The extremely low SNR condition may be associated with, for example, a rainfall, a small satellite antenna, a signal amplifier with a low output that is installed in a transmitter.

A transmitting and receiving device for such a low SNR environment may be classified into a forward link from a satellite center to a terminal and a reverse link from the terminal to the satellite center.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides a transmitting and receiving device that may be embodied to be operable with a low complexity under an extremely low signal-to-noise ratio (SNR) environment, in a conventional satellite communication transmitter.

To achieve the aforementioned aspect of the present disclosure and technical effects described herein, the present disclosure provides the following aspects.

In one general aspect, a signal processing method to be performed by a transmitter, the signal processing method includes converting a transmission signal to a non-periodic sequence type transmission signal using periodic sequences and transmitting the non-periodic sequence type transmission signal to a receiver. The receiver may detect a burst from the received non-periodic sequence type transmission signal.

The converting of the transmission signal to the non-periodic sequence type transmission signal may include generating a non-periodic sequence by alternating a first periodic sequence and a second periodic sequence and performing an operation between one of the first periodic sequence and the second periodic sequence and the transmission signal.

The converting of the transmission signal to the non-periodic sequence type transmission signal may include generating a non-periodic sequence by fixing a scrambling period length and using a sequence pattern.

In another general aspect, a signal processing method to be performed by a receiver, the signal processing method includes receiving, from a transmitter, a non-periodic sequence type signal obtained through conversion using periodic sequences and detecting a burst from the received non-periodic sequence type signal.

The receiving of the non-periodic sequence type signal may include passing the non-periodic sequence type signal using a filter and storing, in a memory, the signal passed through the filter.

The detecting of the burst may include detecting the burst using a circular delay line.

The detecting of the burst may include detecting the burst by changing a sign of a sum of correlation values based on a sequence value.

The detecting of the burst may include detecting the burst based on a window length for burst detection.

The window length for burst detection may be calculated based on an oversampling length.

The detecting of the burst may include detecting the burst using a pilot block length.

The detecting of the burst may include performing an addition operation or a sum operation based on the pilot block length.

The detecting of the burst may include calculating a period based on a burst type.

The detecting of the burst may include generating a correlation value using a plurality of operations based on the calculated period.

In still another general aspect, a transmitter includes a transmission signal converter configured to convert a transmission signal to a non-periodic sequence type transmission signal using periodic sequences and a transmission signal transmitter configured to transmit the non-periodic sequence type transmission signal to a receiver. The receiver may detect a burst from the received non-periodic sequence type transmission signal.

In yet another general aspect, a receiver includes a signal receiver configured to receive a non-periodic sequence type signal obtained through conversion using periodic sequences and a burst detector configured to detect a burst from the received non-periodic sequence type signal.

Other features and aspects will be apparent from the following detailed description, the drawings, and the claims.

Figure 1:
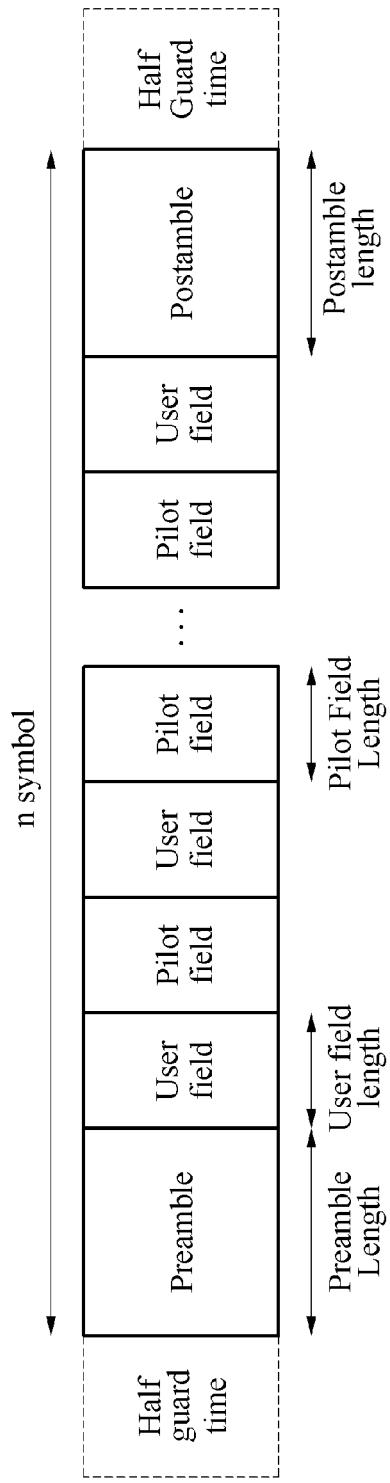
FIG. 1 is a diagram illustrating an example of a configuration of a transmitter signal in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

A transmitter and a receiver configured to perform a signal processing method may transmit a signal under an extremely low signal-to-noise ratio (SNR) environment in a satellite link, and detect the signal. In addition, the transmitter and the receiver may be operable under an extremely low SNR environment in a satellite communication link. A forward link may be a digital video broadcasting (DVB)-satellite-second generation (S2)-extension (DVB-S2X), which is a European standard for satellite broadcasting and communication transmission. A reverse (or return) link may be a DVB-return channel via satellite or return channel over system (RCS)-second generation (DVB-RCS2), which is a European standard for satellite communication transmission. However, examples are not limited thereto.

FIG. 1 is a diagram illustrating an example of a configuration of a transmitter signal in accordance with an embodiment.

FIG. 1 illustrates a configuration of a DVB-S2 standard-based transmitter. According to an example, a transmitter relates to a configuration described in a DVB-RCS2 standard. In the DVB-RCS2 standard, a terminal may make access to a central station through a time division multiple access (TDMA), and transmission may be performed in a form of a burst and a packet. For example, as illustrated in FIG. 1, a single timeslot may be from a start half guard time and a preamble, and a user field and a pilot field that are repeated, to a postamble and an end half guard time. Here, a half guard time refers to a guard time applying an error in a burst transmission arrival time. The preamble, a pilot, and the postamble may be a pre-known signal that is used to detect a burst reception signal. In addition, a user field part may include a modulation signal, for example, a binary phase shift keying (BPSK) signal, a quadrature phase shift keying (QPSK) signal, a 8-phase shift keying (8PSK) signal, and a 16-state quadrature amplitude modulation (16 QAM) signal, as a signal including transmission information data.

Figure 2:
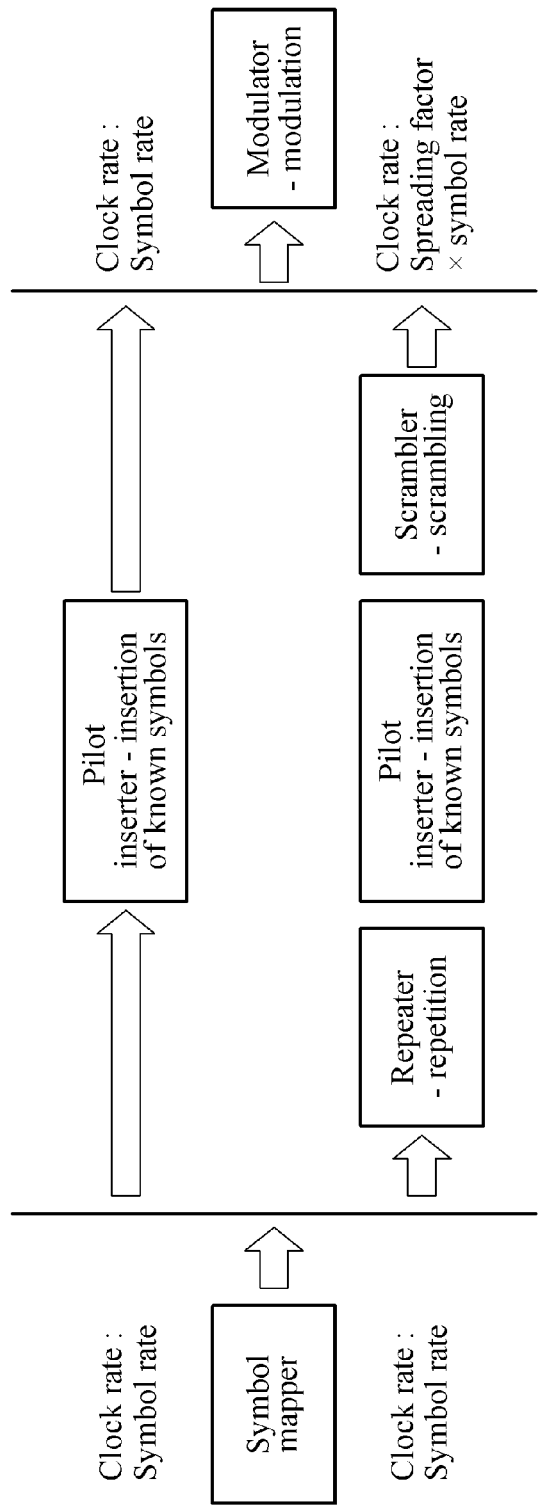
FIG. 2 is a diagram illustrating an example of a modulation method of a transmitter in accordance with an embodiment.

FIG. 2 is a diagram illustrating an example of a modulation method of a transmitter in accordance with an embodiment.

FIG. 2 illustrates a configuration of a transmitter for spectrum spreading. For example, as a modulator of a DVB-RCS2 linear modulation, a symbol mapper may map a binary bit string of an input signal to symbol BPSK, QPSK, 8PSK, 16 QAM. A pilot inserter may indicate a path to which spread-spectrum technology is not applied. A path of a repeater, the pilot inserter, and a scrambler may indicate a path to which the spread-spectrum technology is applied.

The repeater may be a block relating to a spreading factor and indicate that a symbol is repeated twice in a case of the spreading factor being 2 and a symbol is repeated eight times in a case of the spreading factor being 8. In proportion to a spreading factor length, signal energy may be reduced and a bandwidth may be increased. The modulator may include a pulse shaping filter and a digital-to-analog converter, and perform up-conversion and transmit a signal obtained through the up-conversion to a receiver.

Figure 3:
FIG. 3 is a diagram illustrating an example of signal processing of a transmitter in accordance with an embodiment.

FIG. 3 is a diagram illustrating an example of signal processing of a transmitter in accordance with an embodiment.

FIG. 3 illustrates a configuration of a transmitter for DVB-RCS2 based band spreading. A pi (π)/2 BPSK may be mainly used for a modulation method, and repetition may be mainly used for a direct sequence-based method. A pilot symbol may be configured for each waveform identification (ID) based on a preamble length, a postamble length, a pilot period, a pilot block, a pilot sum, and a unique word (UW) hexadecimal (hex) value.

For example, a direct sequence default scrambling sequence may be used as a scrambling sequence. As necessary, when using a different sequence, signaling may be performed on information about a sequence generation polynomial and an initial value, for example, a burst format definition, and the signaled information may be transmitted.

Figure 4:
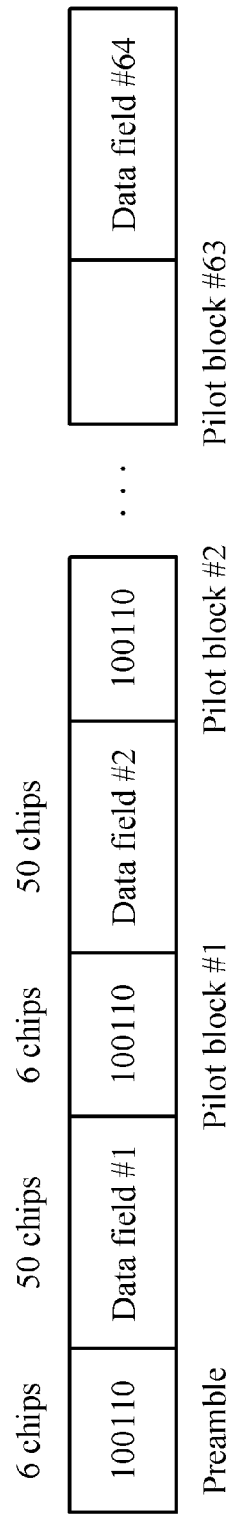
FIG. 4 is a diagram illustrating an example of a configuration of a burst prior to scrambling in accordance with an embodiment.

FIG. 4 is a diagram illustrating an example of a configuration of a burst prior to scrambling in accordance with an embodiment.

FIG. 4 illustrates a configuration of a burst of spread-spectrum waveform ID #1 prior to scrambling.

Referring to FIG. 4, in the burst of waveform ID #1, UW pattern (hex) may be 9A6, a preamble length may be 6 chips, a pilot period may be 56 chips, and a pilot block may be 6 chips.

Figure 5:
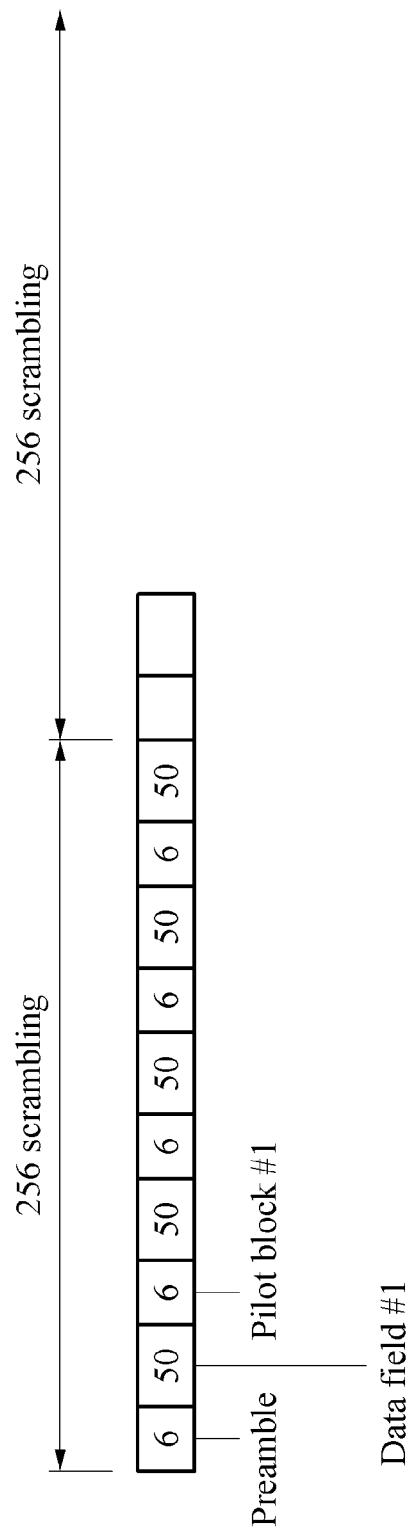
FIG. 5 is a diagram illustrating an example of a configuration of a burst to which scrambling is applied in accordance with an embodiment.

FIG. 5 is a diagram illustrating an example of a configuration of a burst to which scrambling is applied in accordance with an embodiment.

FIG. 5 illustrates a configuration of a burst of spread-spectrum waveform ID #1 to which scrambling is applied. For example, a unit of 256 chips may be applied to a scrambling code. In transmission, a transmission structure of a 256 scrambling sequence may be relatively short. However, in a case of a long scrambling sequence and a great number of scattered pilot blocks as in an initial access burst, for example, a log-on burst (a burst of waveform ID #19), an operation of a correlator for detecting the burst may considerably increase, and thus complexity may considerably increase in terms of implementation.

A structure in which a unit of the 256 scrambling sequence is repeated is illustrated herein. However, the log-on burst may be of a randomly accessible form without timing correction at an initial access, and thus a half guard time may be set to be long to increase an access rate. In general, in a case that a length of the half guard time is greater than a length of a scrambling sequence, a false alarm error may occur in terms of a detection probability when a burst is detected at a point in lieu of an actual point, and thus a new scrambling code may need to be set to solve such an issue related to performance and complexity.

Figure 6:
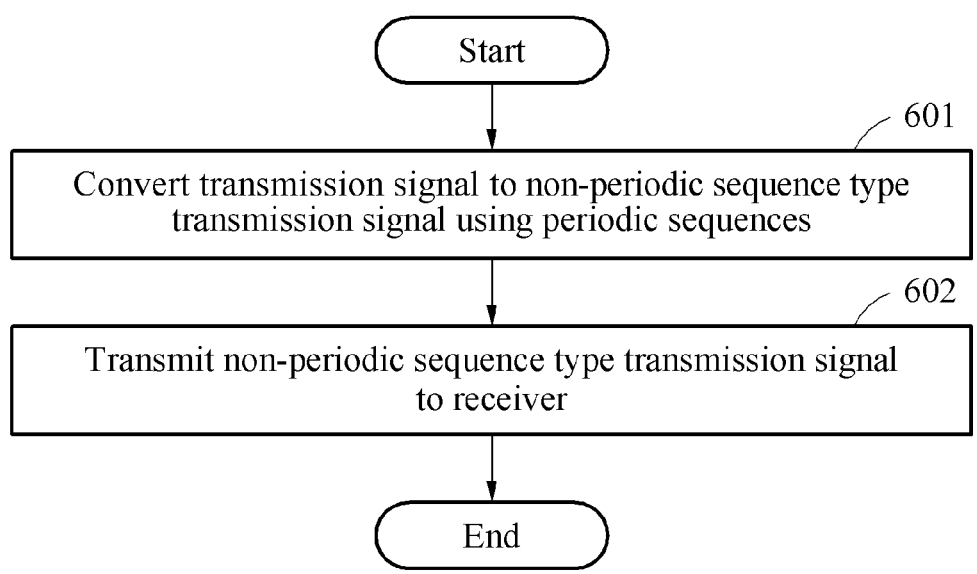
FIG. 6 is a flowchart illustrating an example of a signal processing method performed by a transmitter in accordance with an embodiment.

FIG. 6 is a flowchart illustrating an example of a signal processing method performed by a transmitter in accordance with an embodiment.

Referring to FIG. 6, a signal processing method to be performed by a transmitter may include the following operations. The transmitter may include at least one of an electronic circuit, an electric circuit, an integrated circuit (IC), an electronic device, a magnetic device, a memory, a processor, or a data transceiver, but not be limited thereto.

In operation 601, the transmitter converts a transmission signal to a non-periodic sequence type transmission signal using periodic sequences.

In detail, the transmitter may generate a non-periodic sequence by alternating a first periodic sequence and a second periodic sequence and performing an operation between the transmission signal and one of the first periodic sequence and the second periodic sequence. The transmitter may generate the non-periodic sequence by fixing a scrambling period length and using a certain sequence pattern.

In operation 602, the transmitter transmits, to a receiver, the non-periodic sequence type transmission signal. The receiver may detect a burst from the received non-periodic sequence type transmission signal.

Figure 7:
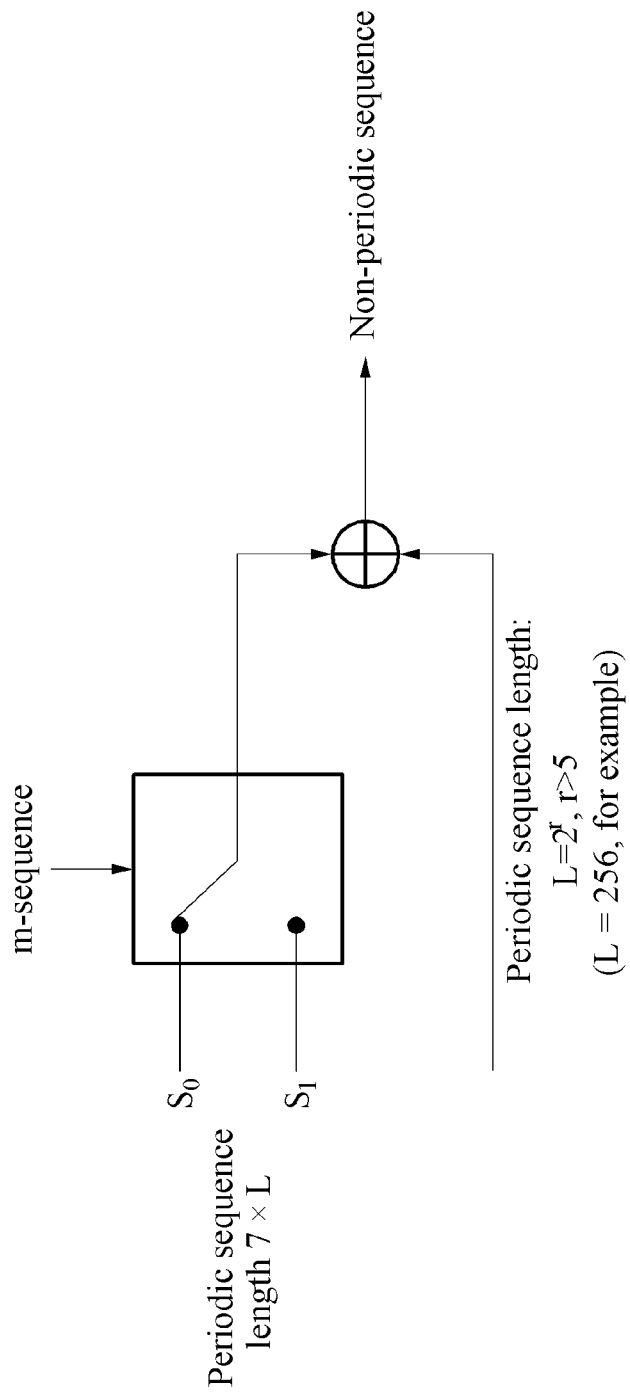
FIG. 7 is a diagram illustrating an example of a signal processing method performed by a transmitter in accordance with an embodiment.

FIG. 7 is a diagram illustrating an example of a signal processing method performed by a transmitter in accordance with an embodiment.

FIG. 7 illustrates a signal processing method to be performed by a transmitter as a scrambling sequence generator for a log-on burst for DVB-RCS2 spread-spectrum technology. The transmitter described herein may be applied to a DVB-RCS2 standard transmitting and receiving modem, although the transmitter may also be applicable to all digital communication devices.

The transmitter may be configured to substitute for a scrambling sequence used in conventional spread-spectrum transmission technology. For example, a default scrambling sequence with a length of 256 chips may be defined in a standard. Such a 256 chip default scrambling sequence standard may need to be applied as a minimum requirement for compatibility among terminals produced by different manufacturers.

Referring to FIG. 7, the transmitter may change a scrambling block. Although a 256 default sequence may be used as a periodic sequence corresponding to a lower path, the transmitter may use two periodic sequences having a length longer by a factor of seven times than a period (L), for example, $S_0$ and $S_1$. For example, using an m-sequence, the transmitter may alternate the two periodic sequences to convert the periodic sequences to a new non-periodic sequence.

The sequences $S_0$ and $S_1$ may be configured as all the sequences being 0, a sequence with a sequence length unit (n) being 0 in an even-numbered periodic scrambling part as in 1~256, 513~768, . . . , and a sequence with a sequence length unit (n) being 1 in an odd-numbered periodic scrambling part as in 257~512, 769~1025, . . . .

Figure 8:
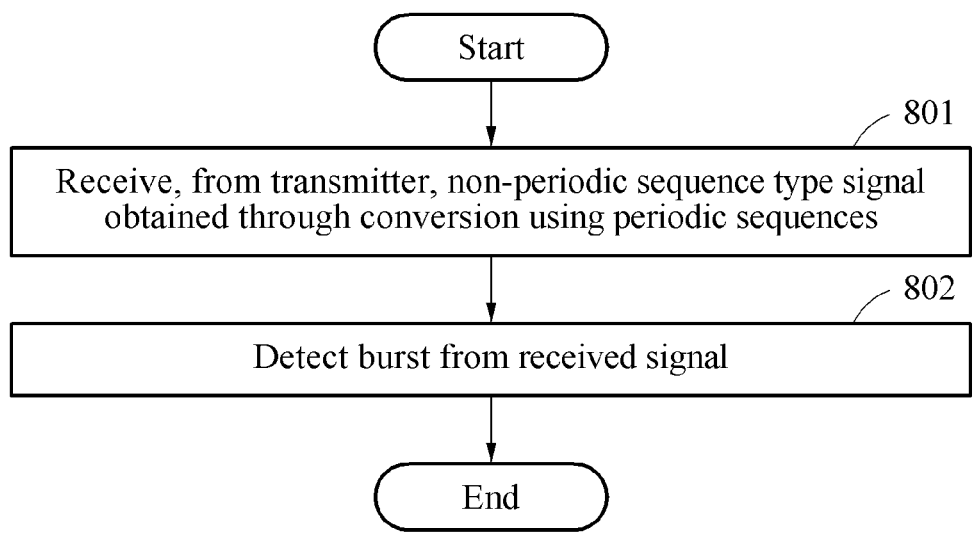
FIG. 8 is a flowchart illustrating an example of a signal processing method performed by a receiver in accordance with an embodiment.

FIG. 8 is a flowchart illustrating an example of a signal processing method performed by a receiver in accordance with an embodiment.

Referring to FIG. 8, a signal processing method to be performed by a receiver may include the following operations. The receiver may include at least one of an electronic circuit, an electric circuit, an IC, an electronic device, a magnetic device, a memory, a processor, or a data transceiver, but not be limited thereto.

In operation 801, the receiver receives, from a transmitter, a non-periodic sequence type signal obtained through conversion using periodic sequences. In addition, the receiver passes the non-periodic sequence type signal using a filter, and stores the signal passed through the filter in a memory.

In operation 802, the receiver detects a burst from the received non-periodic sequence type signal. The receiver detects the burst using a circular delay line. In addition, the receiver detects the burst by changing a sign of a sum of correlation values based on a sequence value.

According to an example, the receiver may detect the burst based on a window length for burst detection. Here, the window length for burst detection may be calculated based on an oversampling length.

According to another example, the receiver may detect the burst using a pilot block length. Here, the receiver may perform an addition operation based on the pilot block length.

According to still another example, the receiver may calculate a period based on a burst type. The receiver may generate a correlation value using a plurality of operations based on the calculated period.

Figure 9:
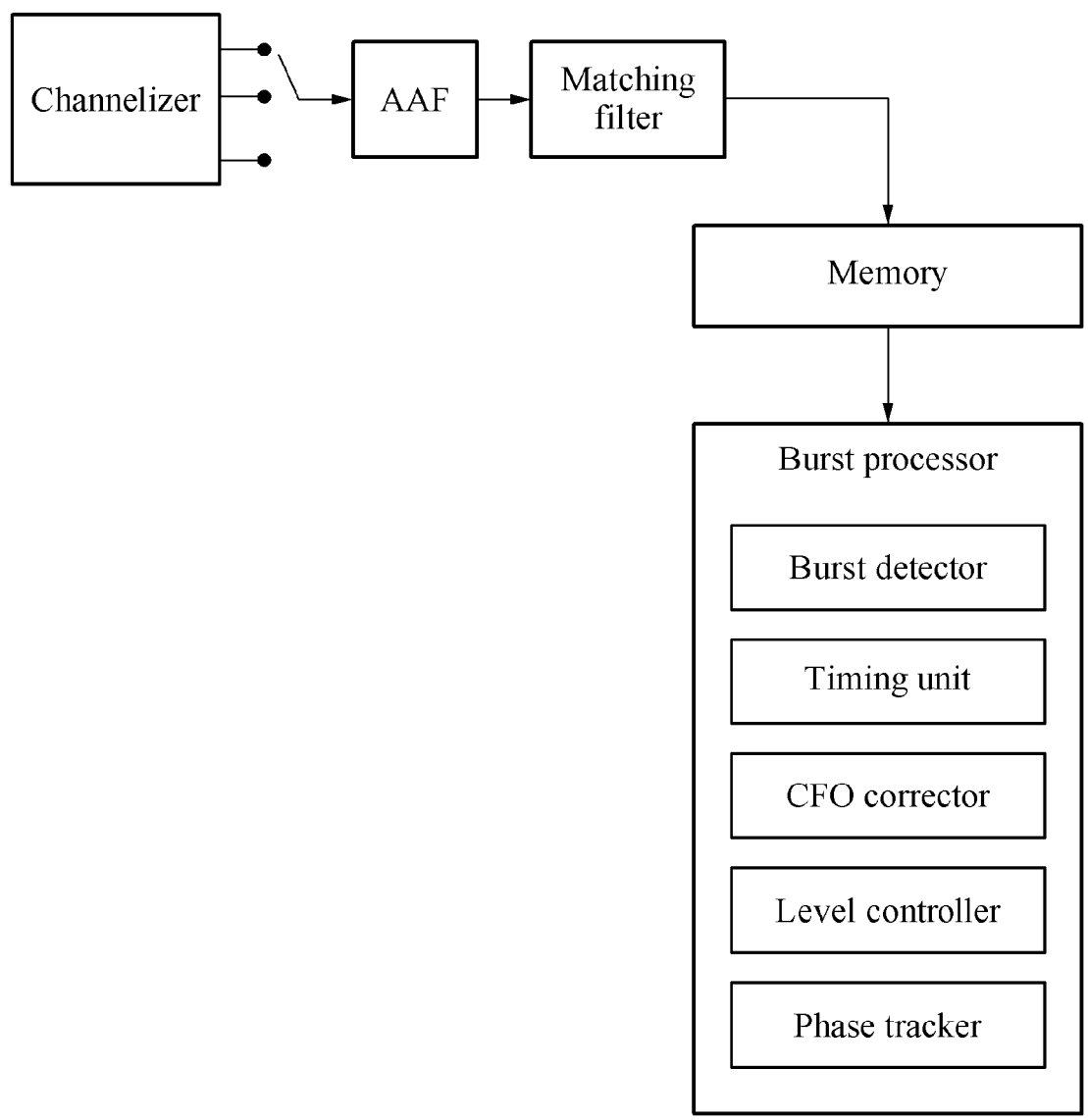
FIG. 9 is a diagram illustrating an example of a configuration of a receiver in accordance with an embodiment.

FIG. 9 is a diagram illustrating an example of a configuration of a receiver in accordance with an embodiment.

FIG. 9 illustrates a configuration of a receiver applied in response to transmission performed using spread-spectrum technology or non-spread-spectrum technology.

In one example, in the receiver, a transmission signal passing through a channel may be input to an analog to digital converter, and pass through a channelizer and then be down-converted to a base band. In addition, to prevent a signal distortion that may occur by downsampling, the signal received by the receiver may pass through an anti-aliasing filter (AAF) and a matching filter, and a signal passed through the filters may be stored in a memory.

The receiver may also include a correlator to detect a start point of a burst signal from the stored signal. The correlator may be, for example, a magnetic correlator, a cross-correlator, and a correlation-type receiver, but not be limited thereto.

Figure 10:
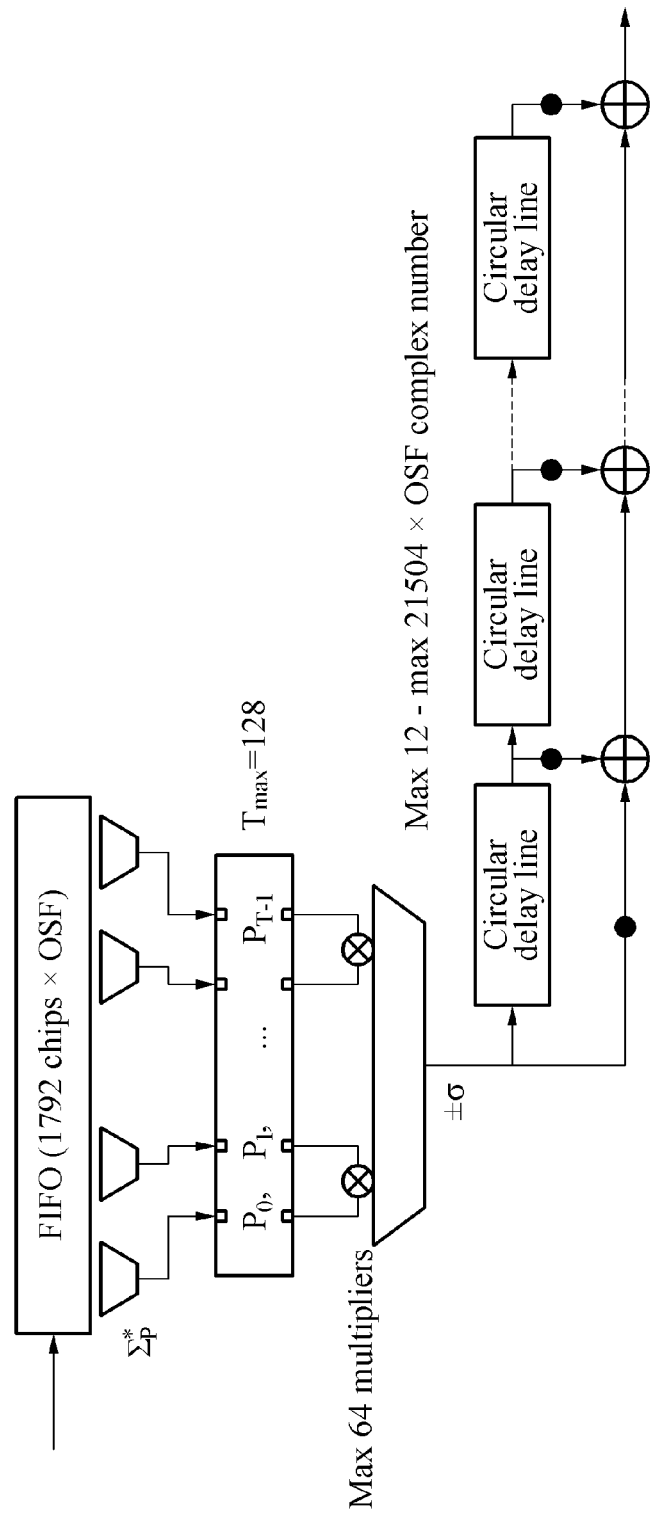
FIG. 10 is a diagram illustrating an example of a signal processing method performed by a receiver in accordance with an embodiment.

FIG. 10 is a diagram illustrating an example of a signal processing method performed by a receiver in accordance with an embodiment.

FIG. 10 illustrates a configuration of a receiver including a burst detector for spectrum spreading.

Referring to FIG. 10, a sample sequence input through a first in, first out (FIFO) method may be stored by a length of 1792 chips×oversampling factor (OSF). Here, a length of 1792 chips may be a least common multiple (LCM) of a 256 scrambling sequence period and a pilot period of all spread bursts of waveform IDs.

As a window length for minimum burst detection, a product of the multiplication of the length of 1792 chips and an oversampling length may be needed for a size of the sample sequence input through the FIFO method. Here, $\Sigma'_p$ denotes a value obtained by an addition operation or a sum operation by a pilot block length. Here, T sums, for example, $P_0, P_1, P_2, \ldots$, may be obtained.

Here, as illustrated in Table 1 below, T may be calculated using a number of partial correlations of a pilot of each waveform ID based on a burst type.

For example, a length of a scrambling sequence may be 256, and a pilot period may be calculated for each waveform ID as represented by Equation 1.

$$\text{Pilot period} = 2^m \times 7 \qquad \text{[Equation 1]}$$

In Equation 1, in a case that m is 3 (m=3), an ID number (ID#) of a waveform ID may be 1, 2, 3, 4, 5, and 6. In a case that m is 4 (m=4), the ID number may be 7, 8, 9, 10, 11, and 12. In a case that m is 5 (m=5), the ID number may be 13, 14, 15, 16, 17, and 18. Thus, T, which is a period of $P_k$, may be calculated to be 1972 chips (=256×7)÷(pilot period), and values resulting from the calculating may be obtained as illustrated in Table 1. For example, in a case of a waveform ID being 3, the pilot period may be 56, and T may be 1972÷56=32.

TABLE 1

| | Waveform ID | | |
|---|---|---|---|
| 1, 2, 3, 4, 5, 6 | 7, 8, 9, 10, 11, 12 | 13, 14, 15, 16, 17, 18 | 19 |
| Period T of $P_k$ 32 | 16 | 8 | 128 |

For example, referring to FIG. 7, under the assumption that the m-sequence is used to select $S_0$ and $S_1$, and $S_0$ is a zero sequence and $S_1$ is a sequence in which 0 and 1 are repeated, an output of each $P_k$ may be in a form of σ in response to $S_0$ being selected, and an output may be in a form of ±σ in response to $S_1$ being selected. Here, since a pattern of $S_1$ is known by the m-sequence, −σ may be output when 1 occurs in the $S_1$ sequence, and thus changing the sign may be more effective in the detection due to a reduced influence of a frequency error or noise. Such a result may be verified with reference to FIG. 13.

A sum may repeat an increase and a decrease because a correlation value does not increase continuously due to a large carrier frequency error by a pilot in a same pattern and a scrambling code, and thus a degradation of performance may need to be prevented. In such a large carrier frequency environment, a differential detection method may be effective. However, in a low SNR environment, such a method may not be effective. In addition, to prevent the degradation of performance, a method of increasing a scrambling period length may be effective. However, in such a case, a complexity of a detector may increase.

According to an example, the receiver may stably detect a burst by fixing a scrambling period length and generating a non-periodic signal by a certain sequence pattern, and changing a sign of a sum of correlation values indicated by round points based on a sequence value and increasing a correlation value. The receiver may also improve performance using a new scrambling sequence received from the transmitter without using the burst detector.

Figure 11:
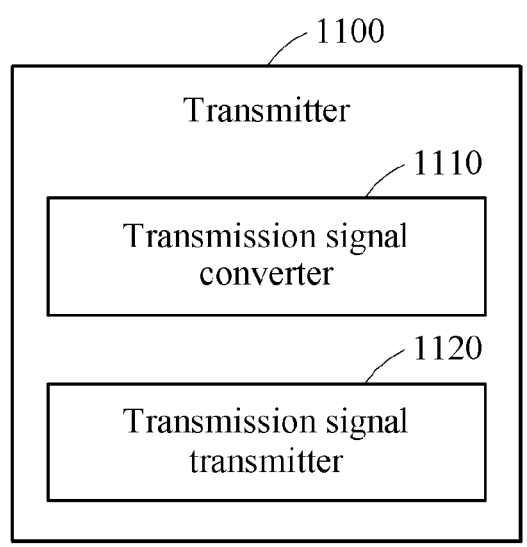
FIG. 11 is a block diagram illustrating an example of a transmitter in accordance with an embodiment.

FIG. 11 is a block diagram illustrating an example of a transmitter in accordance with an embodiment.

Referring to FIG. 11, a transmitter 1100 includes a transmission signal converter 1110 and a transmission signal transmitter 1120. The transmission signal converter 1110 and the transmission signal transmitter 1120 may include at least one of an electronic circuit, an electric circuit, an IC, an electronic device, a magnetic device, a memory, a processor, or a data transceiver, but not be limited thereto.

The transmission signal converter 1110 may convert a transmission signal to a non-periodic sequence type transmission signal using periodic sequences. For example, the transmission signal converter 1110 may generate a non-periodic sequence by alternating a first periodic sequence and a second periodic sequence and performing an operation between one of the first periodic sequence and the second periodic sequence and the transmission signal. In addition, the transmission signal converter 1110 may generate the non-periodic sequence by fixing a scrambling period length and using a certain sequence pattern.

The transmission signal transmitter 1120 may transmit the non-periodic sequence type transmission signal to a receiver. The receiver may detect a burst from the received non-periodic sequence type transmission signal.

Figure 12:
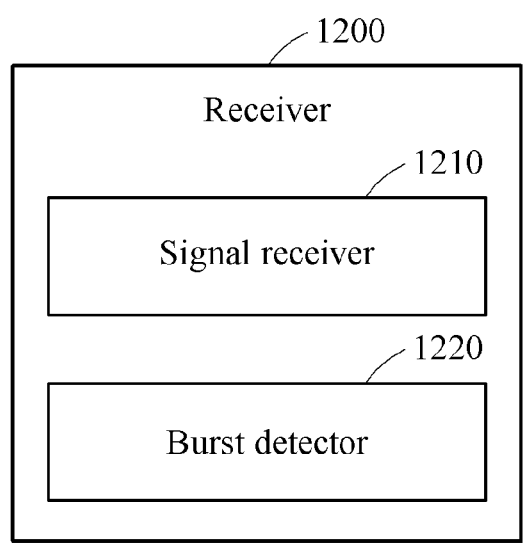
FIG. 12 is a block diagram illustrating an example of a receiver in accordance with an embodiment.

FIG. 12 is a block diagram illustrating an example of a receiver in accordance with an embodiment.

Referring to FIG. 12, a receiver 1200 includes a signal receiver 1210 and a burst detector 1220. The signal receiver 1210 and the burst detector 1220 may include at least one of an electronic circuit, an electric circuit, an IC, an electronic device, a magnetic device, a memory, a processor, or a data transceiver, but not be limited thereto.

The signal receiver 1210 may receive, from a transmitter, a non-periodic sequence type signal obtained through conversion using periodic sequences. The signal receiver 1210 may pass the non-periodic sequence type signal using a filter, and store the signal passed through the filter in a memory.

The burst detector 1220 may detect a burst from the received signal. For example, the burst detector 1220 may detect the burst using a circular delay line. The burst detector 1220 may detect the burst by changing a sign of a sum of correlation values based on a sequence value. For another example, the burst detector 1220 may detect the burst based on a window length for burst detection. The window length for burst detection may be calculated based on an oversampling length. For still another example, the burst detector 1220 may detect the burst using a pilot block length. Here, the receiver 1200 may perform an addition operation or a sum operation based on the pilot block length.

For yet another example, the burst detector 1220 may calculate a period based on a burst type. The burst detector 1220 may generate a correlation value using a plurality of operations based on the calculated period.

Figure 13:
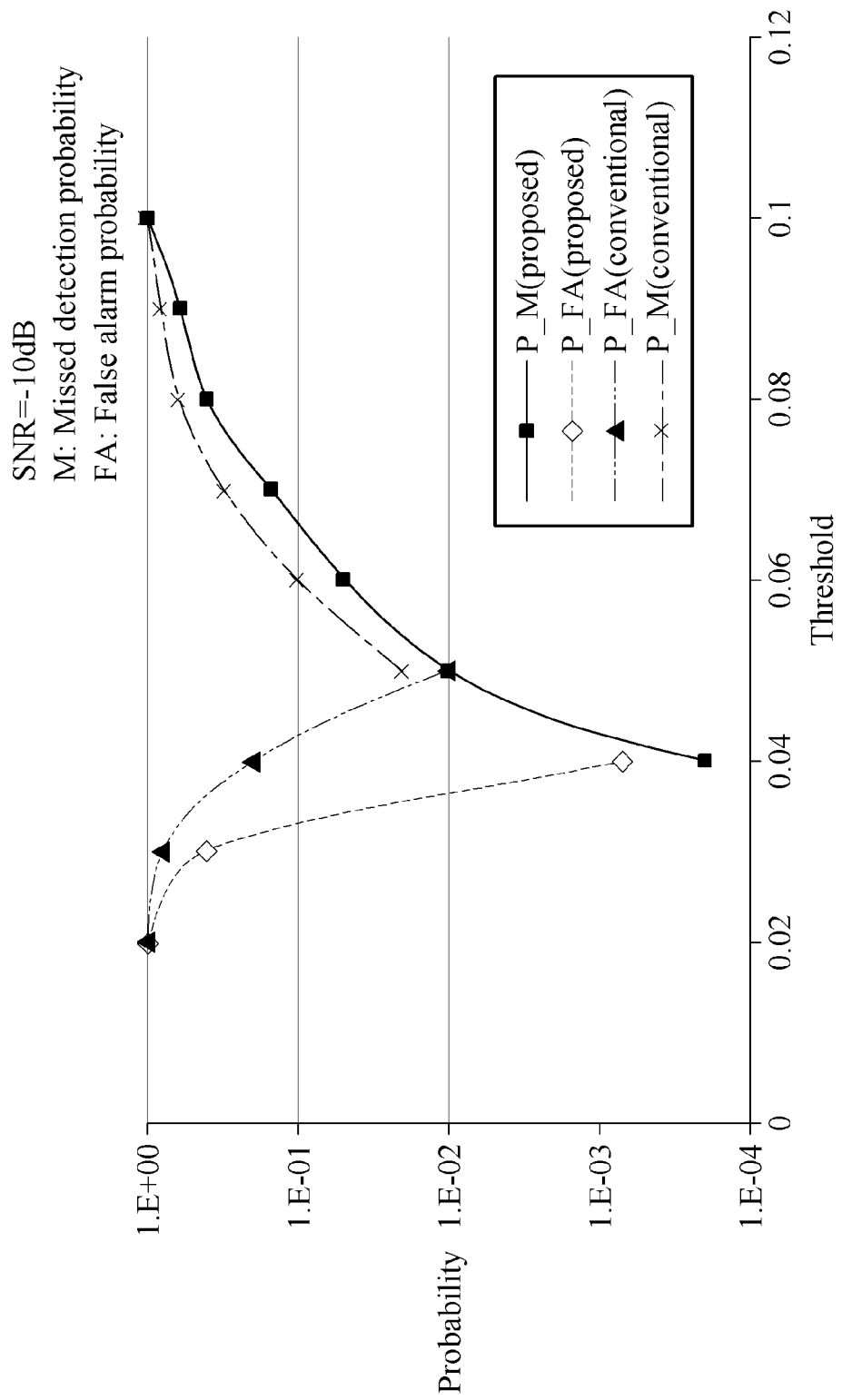
FIG. 13 is a graph illustrating an example of a result of comparing signal processing methods.

FIG. 13 is a graph illustrating an example of a result of comparing signal processing methods.

FIG. 13 illustrates a result of comparing conventional spread-spectrum technology and a signal processing method described herein in terms of performance in detecting a long-on burst. Referring to FIG. 13, the signal processing method may show a higher performance compared to the conventional technology.

In comparison to the conventional technology, the signal processing method may show a considerably lower value in terms of a missed detection probability (M) and a false alarm probability (FA), which are compared to a threshold. It indicates that, compared to the conventional technology, the signal processing method may have a considerably lower probability of detection being missed, and also have a lower probability of a failure in the detection.

According to example embodiments described herein, a signal processing method may achieve an effective performance in detecting a start point of a burst due to a great timing error in a low SNR environment, using a same structure of a burst detector as that used in conventional technology.

The components described in example embodiments of the present disclosure may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A signal processing method, performed by a transmitter, the method comprising:
    converting a transmission signal to a non-periodic sequence type transmission signal by alternating a first periodic sequence and a second periodic sequence; and
    transmitting the non-periodic sequence type transmission signal to a receiver,
    wherein the receiver is configured to detect a burst from the non-periodic sequence type transmission signal,
    wherein the converting of the transmission signal to the non-periodic sequence type transmission signal comprises generating a non-periodic sequence by fixing a scrambling period length and using a sequence pattern,
    wherein the generating of the non-periodic sequence comprises selecting the first periodic sequence and the second periodic sequence using an m-sequence,
    wherein the first periodic sequence is a zero sequence, and
    wherein the second periodic sequence is a sequence in which 0 or 1 is repeated.

2. The method of claim 1, wherein the converting of the transmission signal to the non-periodic sequence type transmission signal comprises:
    performing an operation between one of the first periodic sequence and the second periodic sequence and the transmission signal.

3. The signal processing method of claim 1, wherein the generating of the non-periodic sequence further comprises generating an output in positive form in response to the first periodic sequence being selected, and generating an output in positive or negative form in response to the second periodic sequence being selected.

4. The signal processing method of claim 3, wherein the generating of the non-periodic sequence further comprises generating an output in negative form in response to 1 occurring in the second periodic sequence.

5. A signal processing method, performed by a receiver, the method comprising:
    receiving, from a transmitter, a non-periodic sequence type signal; and
    detecting a burst from the received non-periodic sequence type signal by changing a sign of a sum of correlation values based on a sequence value,
    wherein a transmission signal is converted to the non-periodic sequence type signal by alternating a first periodic sequence and a second periodic sequence,
    wherein the converting of the transmission signal to the non-periodic sequence type signal comprises generating a non-periodic sequence by fixing a scrambling period length and using a sequence pattern,
    wherein the generating of the non-periodic sequence comprises selecting the first periodic sequence and the second periodic sequence using an m-sequence,
    wherein the first periodic sequence is a zero sequence, and
    wherein the second periodic sequence is a sequence in which 0 or 1 is repeated.

6. The method of claim 5, wherein the receiving of the non-periodic sequence type signal comprises:
    passing the non-periodic sequence type signal using a filter, and storing the passed non-periodic sequence type signal in a memory.

7. The method of claim 5, wherein the detecting of the burst comprises:
    detecting the burst using a circular delay line.

8. The method of claim 5, wherein the detecting of the burst comprises:
    detecting the burst based on a window length for burst detection.

9. The method of claim 8, wherein the window length for burst detection is calculated based on an oversampling length.

10. The method of claim 5, wherein the detecting of the burst comprises:
    detecting the burst using a pilot block length.

11. The method of claim 10, wherein the detecting of the burst comprises:
    performing an addition operation based on the pilot block length.

12. The method of claim 5, wherein the detecting of the burst comprises:
    calculating a period based on a burst type.

13. The method of claim 12, wherein the detecting of the burst comprises:
    generating a correlation value using a plurality of operations based on the calculated period.

14. A transmitter, comprising:
    a transmission signal converter configured to convert a transmission signal to a non-periodic sequence type transmission signal by alternating a first periodic sequence and a second periodic sequence; and
    a transmission signal transmitter configured to transmit the non-periodic sequence type transmission signal to a receiver,
    wherein the receiver is configured to detect a burst from the non-periodic sequence type transmission signal,
    wherein the conversion of the transmission signal to the non-periodic sequence type transmission signal comprises generating a non-periodic sequence by fixing a scrambling period length and using a sequence pattern, wherein the generation of the non-periodic sequence comprises selecting the first periodic sequence and the second periodic sequence using an m-sequence,
wherein the first periodic sequence is a zero sequence, and
wherein the second periodic sequence is a sequence in which 0 or 1 is repeated.

* * * * *